United States Patent [19]

Sundaram

[11] Patent Number: 5,710,683
[45] Date of Patent: Jan. 20, 1998

[54] THIN FILM TAPE HEAD WITH SUBSTRATE FOR REDUCED POLE-TIP RECESSION

[75] Inventor: Ramesh Sundaram, Edon Prairie, Minn.

[73] Assignee: Storage Technology Corporation, Louisville, Colo.

[21] Appl. No.: 634,212

[22] Filed: Apr. 18, 1996

[51] Int. Cl.⁶ .................................................. G11B 5/147
[52] U.S. Cl. ................................................... 360/126
[58] Field of Search ................................... 360/126, 123

[56] References Cited

U.S. PATENT DOCUMENTS

| | | | |
|---|---|---|---|
| 4,872,079 | 10/1989 | Roberts | 360/126 |
| 4,951,166 | 8/1990 | Schewe | 360/119 |
| 5,111,352 | 5/1992 | Das | 360/126 |
| 5,241,440 | 8/1993 | Ashida | 360/126 |
| 5,245,493 | 9/1993 | Kawabe | 360/126 |
| 5,296,993 | 3/1994 | Aboaf | 360/126 |

Primary Examiner—A. J. Heinz
Attorney, Agent, or Firm—Sterne Kessler Goldstein and Fox

[57] ABSTRACT

The present invention provides a tape head with reduced pole-tip recession. A recessed substrate and a closure of the tape head are separated by a plurality of layers, which include, for example, a bottom layer, a recessed bottom pole, a gap layer, a top pole and a top layer. The recessed bottom pole is positioned in the recess of the substrate. By utilizing the recessed substrate and the recessed bottom pole, the thickness of the overcoat layer is reduced, thereby reducing the distance between the substrate and the closure at an air-bearing surface of the recording head. With the present invention, wear is reduced, thereby reducing pole tip recession.

14 Claims, 5 Drawing Sheets

THIN FILM TAPE HEAD WITH SUBSTRATE FOR REDUCED POLE-TIP RECESSION

BACKGROUND OF THE INVENTION

1. Field of the Invention

The invention relates to a thin film tape head having improved head performance. More particularly, the invention relates to a thin film tape head having improved head performance due to reduced pole-tip recession.

2. Related Art

Thin film magnetic tape heads are regularly used to employ known principles to store data on a magnetizable recording medium. Conventional thin film tape heads have a plurality of layers deposited on the surface of a substrate which are then positioned between the substrate and a closure. For example, the layers may include a bottom layer, a bottom pole, a gap layer, a coil and a top pole. Because the resulting topography of these layers is non-planar, it is necessary to apply a thick top layer that can be lapped into a planar surface for positioning against the closure.

The air-beating surface end of the thin film tape head is separated from the magnetic recording medium by a predetermined amount of separation. Preferably, this separation between the tape and the head is only a few tenths of a micrometer. It is critical that this small separation between the tape head and the recording medium be maintained constant during use to ensure maximum tape head performance.

In thin film tape heads that are constructed as described in this disclosure, the material at the air bearing surface wears with usage. In particular, the material between the substrate and the closure, namely, the bottom layer, the bottom pole, the gap layer, the top pole and the top layer, wears at a rate different than that of the substrate and the closure. Typically, the materials between the substrate and the closure are softer than the substrate and the closure. Therefore these layers tend to wear faster creating a recess. The resulting tape head profile at the air bearing surface end of the tape is commonly referred to as pole tip recession (PTR). As a result of PTR, the head performance is likely to degrade with usage. Excessive PTR may render the head inoperable.

SUMMARY OF THE INVENTION

In the invention, a thin film recording head includes a substrate and a closure having a plurality of layers deposited on the substrate and positioned between the substrate and the closure. The plurality of layers include a recessed bottom pole deposited on a bottom layer on the substrate. The recessed bottom pole is positioned in a recess located on the side of the substrate. The layers deposited over the recessed bottom pole include a coil structure, a gap layer, a top pole and a top layer.

By using the recessed substrate and recessed bottom pole, a thinner top planarizing layer may be used, thereby reducing the distance between the substrate and the closure at the air bearing surface end of the tape head. As a result, less surface area of the layers between the substrate and the closure is exposed to wear from a tape passing over the air beating surface of the tape head. In the present invention, the top layer exposed at the air bearing surface is thinner than what is found in the traditional tape heads. By reducing the distance between the substrate and the closure, primarily through reduction in the thickness of the top layer, the extent and growth rate of PTR during use is reduced.

The present invention may also be utilized in a type of tape head referred to as a "piggy-back" tape head. The present invention may also be used in multi-track tape heads.

A primary advantage of the invention is to reduce the effects of PTR on the tape head.

Another advantage of the invention is to use conventional tape head materials to reduce PTR.

Another advantage of the invention is to reduce the rate of growth of PTR with usage.

Other objects, advantages, and salient features of the invention will become apparent from the following detailed description, which, taken in conjunction with the annexed drawings, discloses preferred embodiments of the invention.

BRIEF DESCRIPTION OF THE FIGURES

Referring now to the drawings which form a part of this original disclosure.

DETAILED DESCRIPTION OF THE PREFERRED EMBODIMENTS

Figure 1:
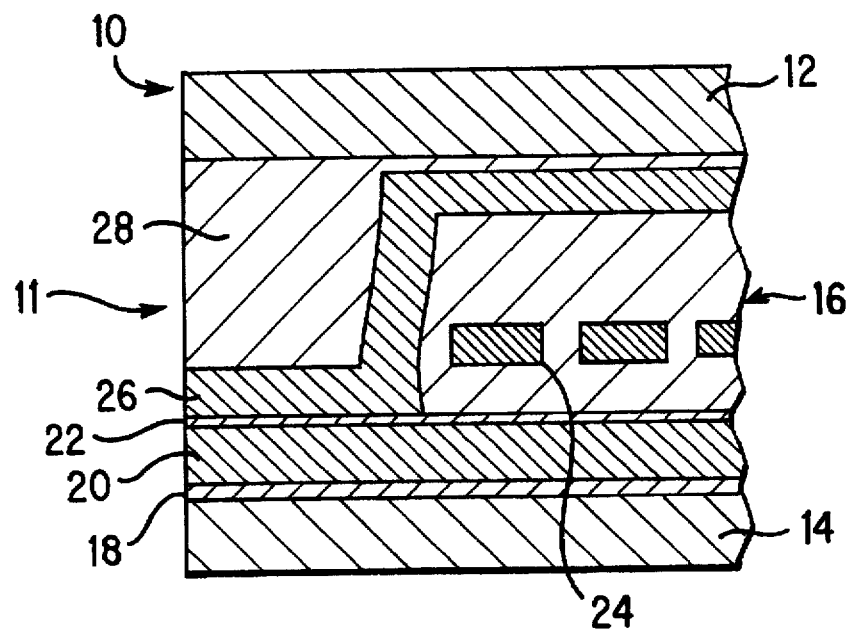
FIG. 1 shows a cross-sectional view of a related art thin film tape head.

FIG. 1 shows a cross-sectional view of a related art thin film tape head shown generally by reference number 10. Tape head 10 has an air bearing surface end 11 for being positioned adjacent a tape (not shown). The tape passes over air bearing surface end 11 of tape head 10 so that data is read to and written from tape head 10 in accordance with conventional practice.

Tape head 10 comprises a closure 12 and a substrate 14 made of aluminum oxide titanium carbide or other equivalent material. Between closure 12 and substrate 14 are a plurality of layers shown generally by reference numeral 16. Layers 16 include an alumina underlayer 18 deposited on substrate 14. A planar bottom pole 20 deposited on underlayer 18. A gap layer 22 made of an insulating material such as alumina is deposited on planar bottom pole 20. A coil structure 24 is built up over gap layer 22. This is done in accordance with conventional practice. A top pole 26 is deposited on gap layer 22 and over coil structure 24. As a result, top pole 26 has a resulting bulged shape. The topography of the deposited layers at the end of the above-mentioned process is non-planar. Because a planar surface is needed for attaching the closure 12, it is necessary to deposit a thick overcoat alumina layer 28 over top pole 26 and lap thick overcoat alumina layer 28 back to create a planar surface.

Figure 2:
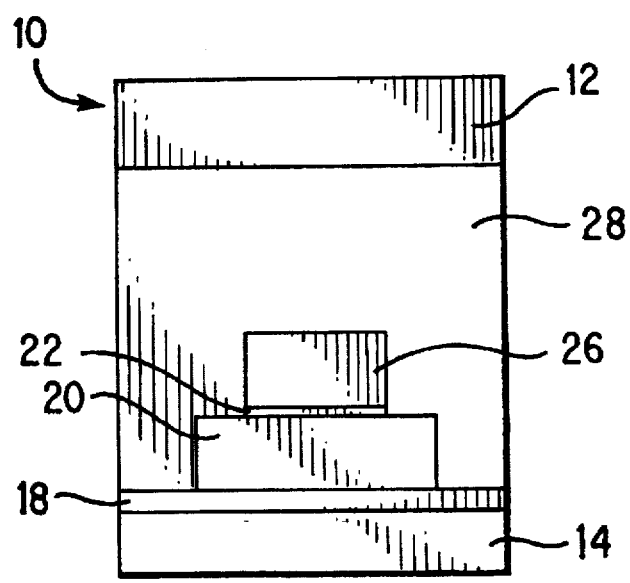
FIG. 2 shows an air beating surface end view of a related art thin film tape head.

As illustrated in FIG. 2, a distance between closure 12 and substrate 14 is determined by the thicknesses of layers 16. In the types of tape heads similar to tape head 10, this distance is approximately 40 microns comprising 2 microns of underlayer 18, 5 microns of bottom pole 20, 1 micron of gap layer, 5 microns of top pole 26 and at least 25 microns of overcoat layer 28 between top pole 26 and closure 12.

These layers 16 suffer from pole tip recession (PTR) at air bearing surface end 11 of tape head 10. PTR is the term used to describe the wearing or recessing of layers 16, and especially the top pole 26 and the bottom pole 20 between closure 12 and substrate 14 from a tape (not shown) passing across air bearing surface end 11 of tape head 10.

Applicant has found that the impact of PTR can be decreased by reducing the distance between a closure and a substrate of a tape head. Specifically, if the distance between the closure and the substrate is reduced, the layers between them are less prone to wear. Accordingly, with the present invention, the details of which will be discussed in the following discussion, tape heads with assured performance and increased life can be made due to reduced PTR.

Figure 3:
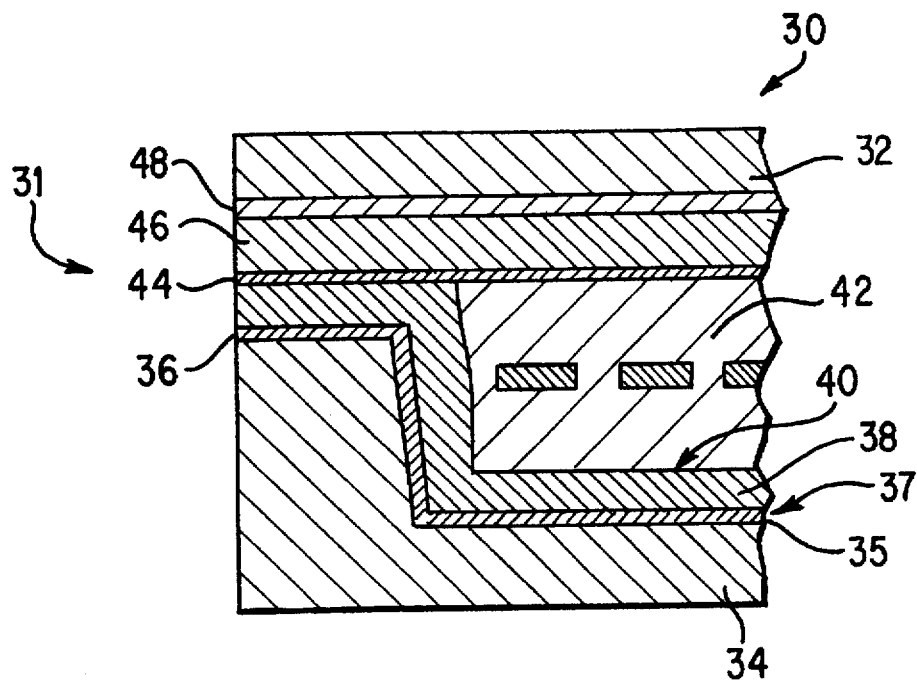
FIG. 3 shows a cross-sectional view of a thin film recording head of the present invention.

Referring now to FIG. 3 a tape head 30 comprising a thin film magnetic tape recording head is shown in accordance with one embodiment of the present invention. In use, an air bearing surface end 31 of tape head 30 is positioned adjacent to a recording medium (not shown) for reading and/or writing data. Tape head 30 includes a closure 32 and a substrate 34 separated by a plurality of layers. Substrate 34 is formed into a contiguous block of material, such as aluminum oxide titanium carbide or other equivalent material. The distance between closure 32 and substrate 34 can be reduced by creating a recess 37 on a side 36 of substrate 34. Recess 37 thus defines a recessed portion along otherwise substantially planar side 36. A bottom layer 35 comprising an insulating alumina underlayer of a substantially constant thickness is deposited on substrate 34. A recessed bottom pole 38 is positioned adjacent bottom layer 35 such that a recess 40 in recessed bottom pole 38 corresponds to recess 37 in substrate 34. A coil structure 42 is deposited in recess 40 of recessed bottom pole 38. Coil structure 42 is built in recess 40 in accordance with conventional practice. As shown, a gap layer 44 is deposited on bottom pole 38 and coil structure 42. It is within the scope of the invention to deposit a gap layer on the bottom pole 38 prior to depositing coil structure 42. In such case, the gap layer would be deposited along bottom pole 38 and have a shape corresponding to the shape of the bottom pole 38. A planar top pole 46 is deposited on gap layer 44. Because recessed bottom pole 38 and recessed substrate 34 are used, recess 40 in recessed bottom pole 38 extends into substrate 34 beyond side 36 of substrate 34. Thus, the topography of the layers deposited on substrate 34 are, in part, recessed into substrate 34, the topography has less severe gradients than tape head 10, shown in FIGS. 1 and 2. Therefore, with the present invention, a thinner top layer 48 comprising an insulating alumina overcoat can be deposited over top pole 46 and lapped back into a planar surface. Specifically, a portion of top layer 48 between top pole 46 and closure 32 is reduced, thereby reducing the overall distance between closure 32 and substrate 34 at air bearing surface end 31 of tape head 30.

Figure 4:
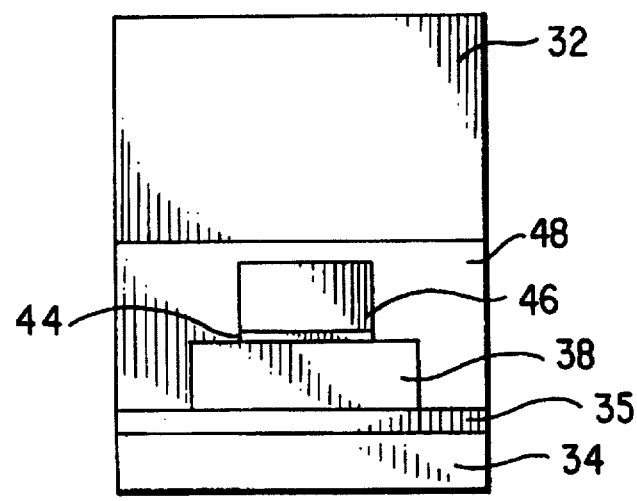
FIG. 4 shows an air bearing surface end view of the thin film recording head of the present invention.

In the present invention as shown in FIGS. 3 and 4, the distance between closure 32 and substrate 34 is approximately 15 microns as compared to FIGS. 1 and 2 where the distance is at least 40 microns. In the present invention, bottom layer 35 is substantially 2 microns thick, bottom pole 38 is substantially 5 microns thick, gap layer 44 is substantially 1 micron thick, top pole 46 is substantially 5 microns thick and top layer 48 between top pole 46 and closure 32 is substantially 2 microns thick.

Substrate 34 and closure 32 are made of a material that has a greater wear resistance than the wear resistance of the material that the layers deposited between substrate 34 and closure 32. Because substrate 34 and closure 32 are made of aluminum oxide titanium carbide and have a greater wear resistance than the layers between them, it is more difficult for the tape to wear the layers between substrate 34 and closure 32 when the distance between the substrate 34 and the closure 32 is decreased.

Figure 5:
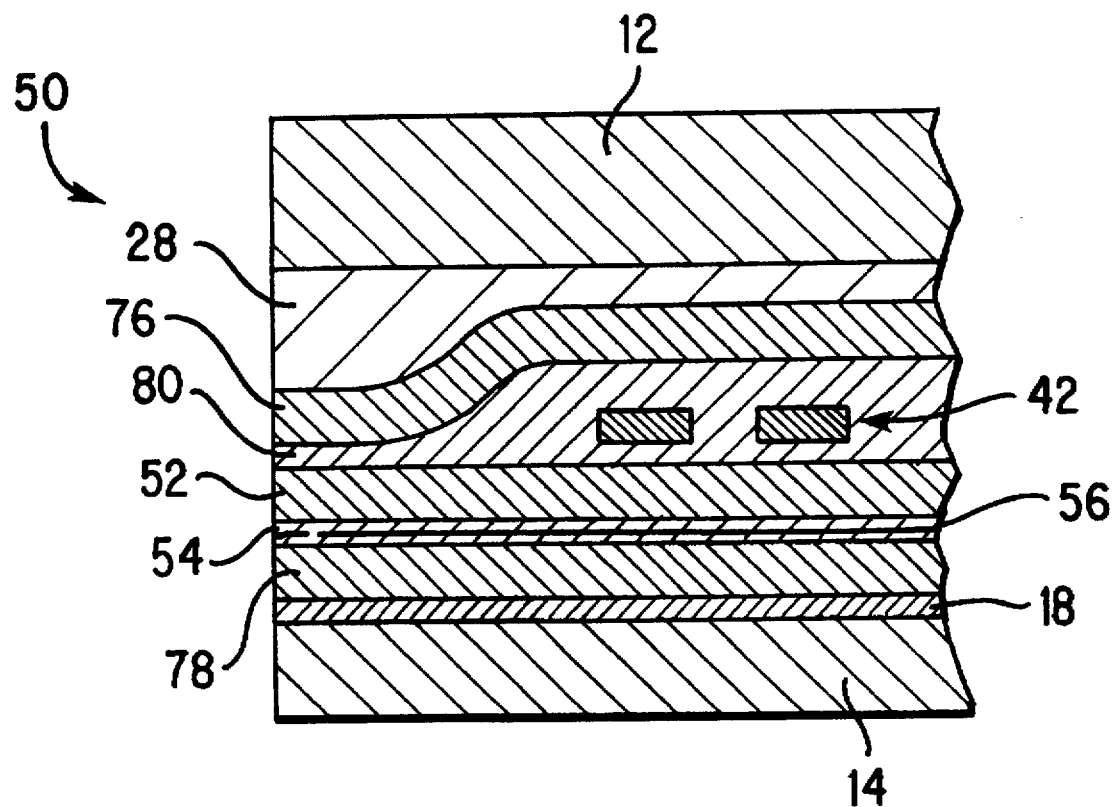
FIG. 5 shows a cross-sectional view of a related art thin film tape head of a merged type thin film recording head.

Referring now to FIG. 5, a cross-sectional view of a related art merged head is shown generally at 50. These tape heads may be referred to as dual element heads, merged heads or piggy-back head, however, for simplicity will be described as a merged head herein. Tape head 50 includes a top pole 76, a shared pole 52 and a bottom pole 78. Between bottom pole 78 and shared pole 52 is read 54 gap and between shared pole 52 and top pole 76 is a write gap 80. Write gap 80 is of the type comprising coil structure 42 and read gap 54 is of the type having Magneto-resistive (MR) element 56. Similar to FIGS. 1 and 2, a thick top layer 28 must be applied and lapped so that closure 12 can be attached.

Figure 6:
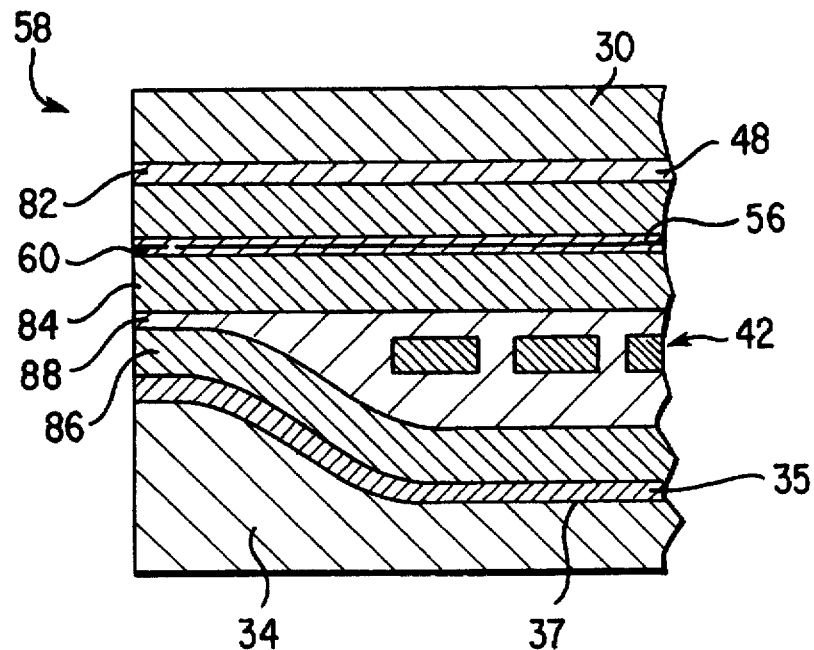
FIG. 6 shows a cross-sectional view of an embodiment of a thin film recording head of a merged type thin film recording head in accordance with the present invention.
Figure 7:
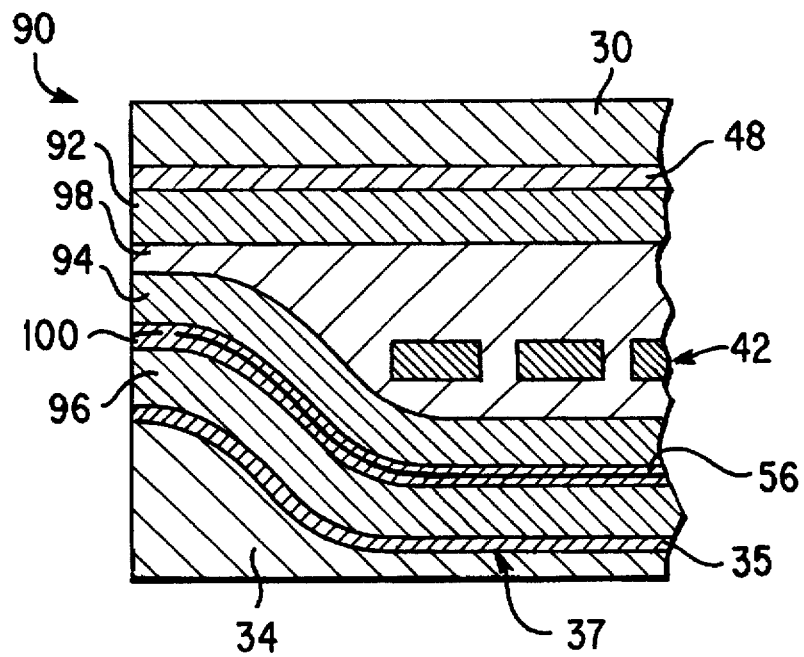
FIG. 7 shows a cross-sectional view of another embodiment of a thin film recording head of a merged type thin film recording head in accordance with the present invention.

The embodiment of the present invention that relates to merged tape heads is illustrated in FIGS. 6 and 7. FIG. 6 shows a merged tape head 58 with a substantially planar top pole 82, a substantially planar shared pole 84 and a recessed bottom pole 86. A read gap 60 including MR element 56 is between shared pole 84 and top pole 82. A write gap 88 including coil structure 42 is between shared pole 84 and bottom pole 86. In the embodiment shown in FIG. 6, bottom pole 86 is recessed. Recessed bottom pole 86 corresponds to recess 37 in substrate 34, thereby yielding a thinner top layer 48 as discussed earlier with reference to FIGS. 3 and 4.

In the alternative, as shown in FIG. 7, a merged tape 90 is shown having a top pole 92, a recessed shared pole 94 and a recessed bottom pole 96. Between top pole 92 and recessed shared pole 94 is write gap 98 including coil structure 42. Between recessed shared pole 94 and recessed bottom pole 96 is read gap 100 including MR element 56.

Both embodiments shown in FIGS. 6 and 7 have the same advantages as discussed with reference to FIGS. 3 and 4.

Figure 8:
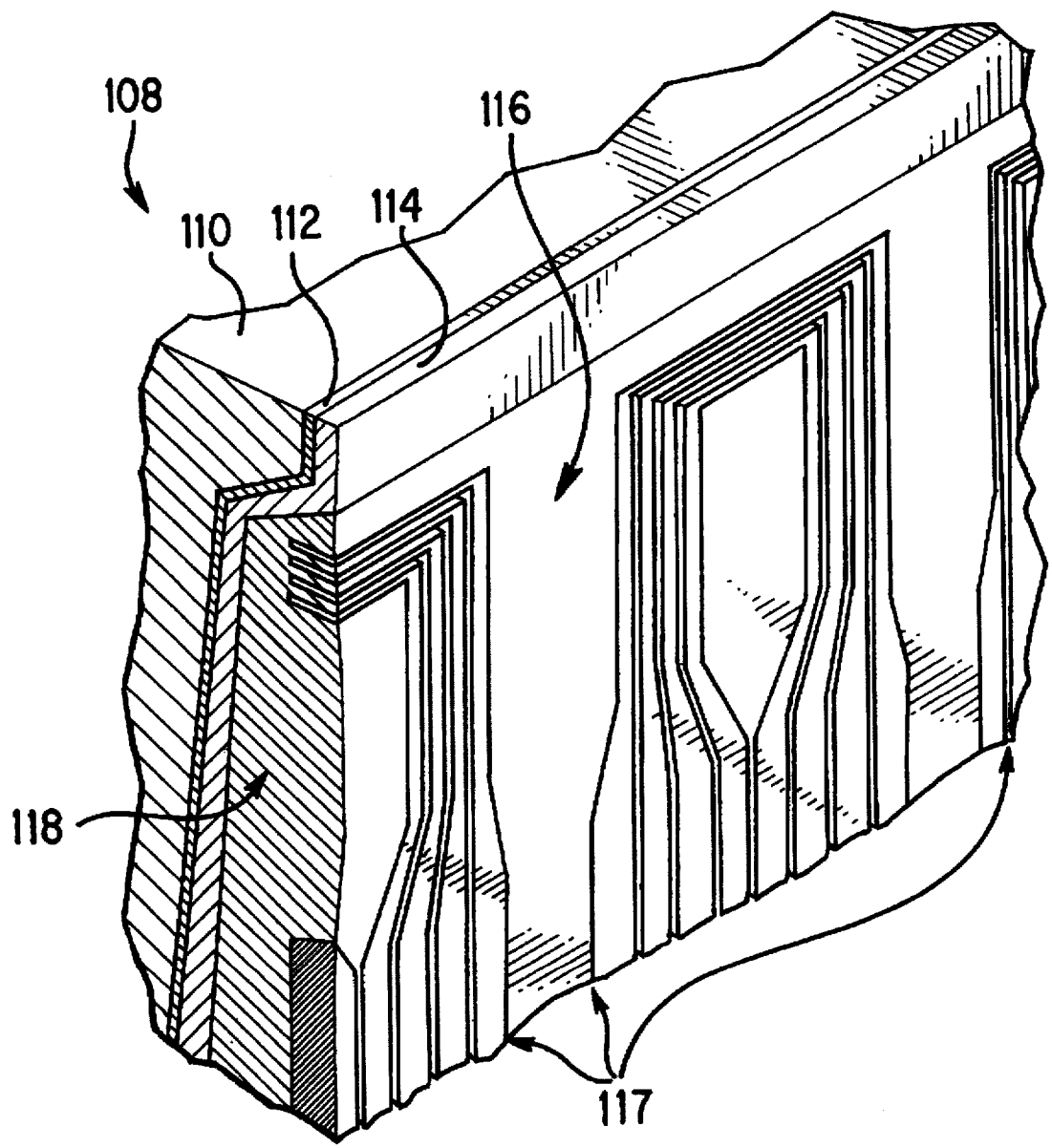
FIG. 8 shows a portion of a multi-track thin film tape head of the present invention.

Although the tape heads of the present invention have been described with an insulating bottom layer 35 positioned between the substrate and bottom pole, it is within the scope of the invention to eliminate this bottom layer by using an insulating substrate construction. In addition, although a single tape head has been shown and described, a multi-track tape head can be used to incorporate the recessed tape head structure of the present invention. A portion of a multi-track tape head is shown in FIG. 8 generally at 108, where a gap layer, top pole, planarizing layer and closure of the present invention are removed for purposes of illustrating the multi-track aspect of the invention. The portion of multi-track tape head 108 shown includes recessed substrate 110, bottom layer 112, recessed bottom pole 114 and a coil structure 116 including multiple coils 117 built-up along a recess 118 of recessed bottom pole 114.

While advantageous embodiments have been chosen to illustrate the invention, it will be understood by those skilled in the art that various changes and modifications can be made therein without departing from the scope of the invention as defined in the appended claims. For example, it is within the scope of the invention to eliminate the use of a discrete bottom layer when an substrate of insulating material is used.

What is claimed is:

1. A thin film magnetic tape recording head, comprising:
   a substrate having a substantially planar side with a substrate recess defining a recessed portion along said side;

a closure; and a plurality of layers positioned between said substrate and said closure, said plurality of layers comprising, a recessed bottom pole positioned along said side of said substrate, wherein said recessed bottom pole has a pole recess adjacent to said substrate recess in said side of said substrate whereby said pole recess extends into said substrate beyond said substantially planar side, a coil structure deposited in said pole recess, a gap layer deposited between said recessed bottom pole and said closure, a top pole positioned between said gap layer and said closure, and a top layer positioned between said top pole and said closure and having a substantially uniform thickness, wherein said top layer has a thinness sufficient to reduce a distance between said substrate and said closure at an air bearing surface end of the head; and wherein said top layer exposed at said air bearing surface between said top pole and said closure is sufficiently thin that a distance between said substrate and said closure is defined substantially by said recessed bottom pole and said top pole.

2. A thin film magnetic tape recording head according to claim 1, further comprising a bottom layer positioned between said bottom pole and said substrate.

3. A thin film magnetic tape recording head according to claim 1, wherein said distance between said closure and said substrate is substantially 15 microns and said top layer comprises 2 microns of said distance.

4. A thin film magnetic tape recording head according to claim 1, wherein a portion of said gap layer is deposited between said top pole and said coil.

5. A thin film magnetic tape recording head according to claim 1, wherein said top pole is substantially planar.

6. A thin film magnetic tape recording head according to claim 1, wherein said plurality of layers further comprises:

a shared top pole deposited between said top pole and said bottom pole;

a first gap layer between said bottom pole and said shared pole; and a second gap layer between said top pole and said shared pole, wherein said second gap layer defines a read gap and said first gap layer defines a write gap.

7. A thin film magnetic tape recording head according to claim 6, wherein said top layer at said air bearing surface is sufficiently thin that a distance between said substrate and said closure is defined substantially by said recessed bottom pole, said first gap layer, said shared pole, said second gap layer and said top pole.

8. A thin film magnetic tape recording head according to claim 1, wherein said plurality of layers further comprises:

a recessed shared pole deposited between said top pole and said first recessed bottom pole;

a first gap layer between said top pole and said recessed shared pole; and a second gap layer between said recessed bottom pole and said recessed shared pole, wherein said second gap layer defines a read gap and said first gap layer defines a write gap.

9. A thin film magnetic tape recording head according to claim 1, wherein said top layer comprises alumina, and said closure and said substrate comprise aluminum oxide titanium carbide.

10. A thin film magnetic tape recording head, comprising:

a substrate having a substantially planar side with a substrate recess defining a recessed surface portion along said substantially planar side;

a closure; and a plurality of layers positioned between said substrate and said closure, said plurality of layers comprising, a recessed bottom pole positioned along said side of said substrate, wherein said recessed bottom pole has a pole recess adjacent to said substrate recess in said side of said substrate, whereby said pole recess extends into said substrate beyond said substantially planar side, a first gap layer deposited between said recessed bottom pole and said closure, a shared pole deposited between said first gap layer and said closure, a second gap layer deposited between said shared pole and said closure, a top pole positioned between said second gap layer and said closure, and a top layer positioned between said top pole and said closure, wherein said top layer has a substantially uniform thickness and a thinness sufficient to reduce a distance between said substrate and said closure at an air bearing surface end of the head, such that said distance is substantially defined by said bottom pole, said shared pole, and said top pole.

11. A thin film magnetic tape recording head according to claim 10, further comprising:

a bottom layer positioned between said bottom pole and said substrate.

12. A thin film magnetic tape recording head according to claim 10, wherein said shared pole is recessed and said first gap layer comprises a read gap layer and said second gap layer comprises a write gap layer.

13. A thin film magnetic tape recording head according to claim 10, wherein said shared pole is substantially planar and said first gap layer comprises a write gap layer and said second gap layer comprises a read gap layer.

14. A multi-track thin film magnetic tape head, comprising a plurality of thin film magnetic tape recording heads, wherein each thin film magnetic tape recording head comprises:

a substrate having a substantially planar side with a substrate recess defining a recessed surface portion along said substantially planar side;

a closure; and a plurality of layers positioned between said substrate and said closure, said plurality of layers comprising, a recessed bottom pole positioned along said side of said substrate, wherein said recessed bottom pole has a pole recess adjacent to said substrate recess in said side of said substrate whereby said pole recess extends into said substrate beyond said substantially planar side, a coil structure including multiple coils deposited along said recess, a gap layer deposited between said recessed bottom pole and said closure, a top pole positioned between said gap layer and said closure, and a top layer positioned between said top pole and said closure and having a substantially uniform thickness, wherein said top layer has a thinness sufficient to reduce a distance between said substrate and said closure at an air bearing surface end of the head.

* * * * *